C. S. BROWN.
TRANSMISSION LOCK.
APPLICATION FILED MAR. 18, 1919.
1,323,447.  Patented Dec. 2, 1919.
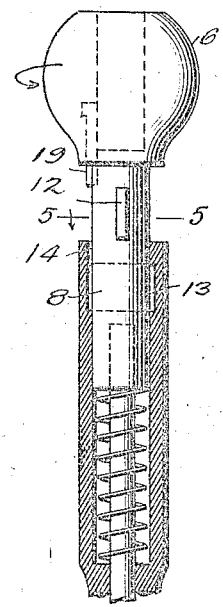
Fig. 1.
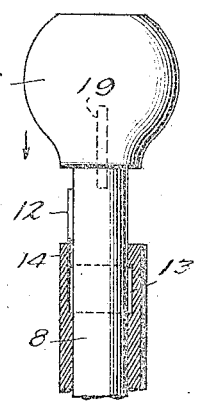
Fig. 2.
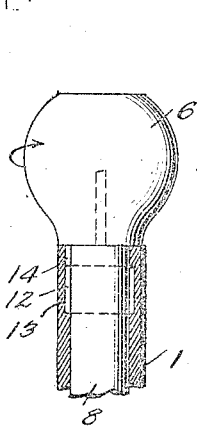
Fig. 3.
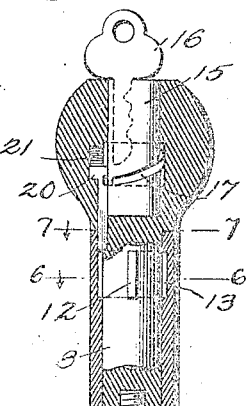
Fig. 4.
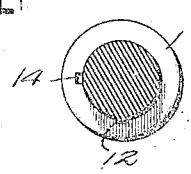
Fig. 5.
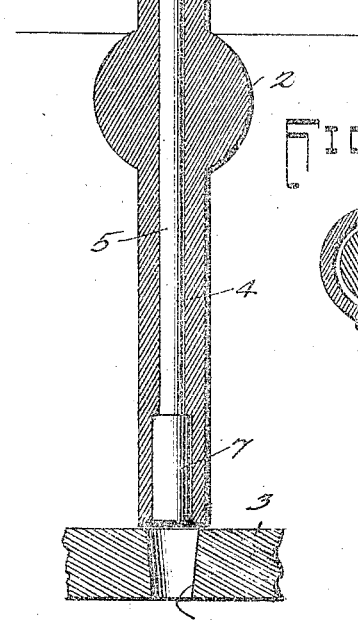
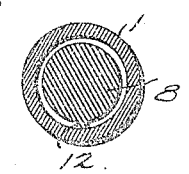
Fig. 6.
Fig. 7.
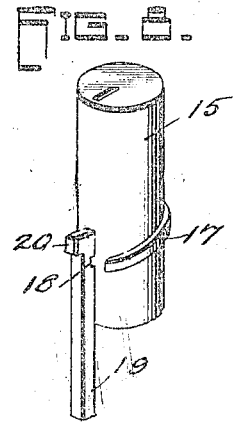
Fig. 8.
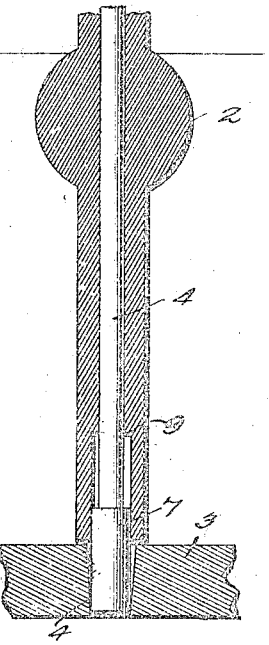
WITNESSES
John H. Phillips Jr.
INVENTOR
CHARLES S. BROWN
BY
ATTORNEYS ered to the knob 6. When it is de-

UNITED STATES PATENT OFFICE.

CHARLES SOMNER BROWN, OF EAST CHICAGO, INDIANA.

TRANSMISSION-LOCK.

1,323,447.　　Specification of Letters Patent.　　Patented Dec. 2, 1919.

Application filed March 18, 1919. Serial No. 283,400.

*To all whom it may concern:*

Be it known that I, CHARLES SOMNER BROWN, a citizen of the United States, and a resident of East Chicago, in the county of Lake and State of Indiana, have invented certain new and useful Improvements in Transmission-Locks, of which the following is a specification.

My invention is an improvement in transmission locks, and has for its object to provide a device of the character specified for use in connection with the transmissions of motor vehicles, for locking said transmissions in neutral position.

In the drawings:

Figure 1 is a longitudinal section through a transmission controlling lever provided with the improved lock;

Fig. 2 is a similar view of the upper end of Fig. 1, with the parts in another position;

Fig. 3 is a view similar to Fig. 2, showing the parts in locked position;

Fig. 4 is a view similar to Fig. 1, showing the parts in locked position;

Fig. 5 is a section on the line 5—5 of Fig. 1;

Figs. 6 and 7 are sections on the lines 6—6 and 7—7, respectively, of Fig. 4;

Fig. 8 is a perspective view of the lock and tumbler.

The present embodiment of the invention is shown in connection with a transmission controlling lever 1 of usual construction, said lever being tubular and having intermediate its ends the ball 2 by means of which it may be pivotally mounted. At the lower end of the lever there is arranged a bracket 3 having a tapering opening 4 which, when the lever is in neutral position, will aline with the bore 4 of the lever.

Within this bore is mounted to slide a locking rod 5, the said rod having at its upper end and above the lever a controlling knob 6, and it will be noticed that at each end of the rod there is an enlargement 7 and 8, respectively, the enlargement 8 being adjacent to the knob 6. The enlargement 7 fits within a reamed or counterbored portion 9 in the lower end of the lever, and the enlarged portion 8 fits within a similar portion 10 at the upper end of the lever. A coil spring 11 encircles the rod between the lower end of the enlargement 8 and the bottom of the counterbore 10, and acts normally to force the locking rod upward.

The enlargement 8 is provided near the knob with a longitudinally extending key 12, and this key is adapted to move within an annular groove or enlargement 13 in the portion 10 of the bore of the lever when the rod is in locking position. A passage 14 leads to the annular groove 13, the said groove being spaced slightly below the upper end of the lever, and it will be evident that the key 12 must be made to register with the passage 14 before the rod may be moved downward into locking position. After the rod is in locking position, when the key 12 is turned out of register with the passage 13, the rod is held from upward movement under the influence of the spring, that is, it is held in locked position.

A lock 15 of any suitable type is mounted to rotate in the upper end of the knob, the said knob serving as a casing for the rotatable portion of the lock, and the said lock may be of any suitable or desired type, as, for instance, a Yale lock, and it is operated by a key 16. This rotatable portion 15 of the lock has an external spirally arranged rib 17, and this rib is adapted to engage a transverse notch 18 in a tumbler 19 which, in turn, is adapted to engage at its lower end the passage 14, when the knob is in locked position to lock the rod to the lever. The tumbler also has a laterally extending lug 20 at its upper end which moves within a recess 21 in the knob, limiting thus the movement of the tumbler in each direction. Referring to Fig. 4, it will be noticed that the enlargement 8 is independent of the rod, the rod being threaded into an opening in the lower end of the said enlargement. This is to facilitate assembling and disassembling the locking rod.

In use, with the parts in the position of Fig. 1, that is, with the lever in released position, it may be operated in the usual manner, by means of the knob 6. When it is desired to lock the transmission, the lever is moved into neutral position, at which time the tapering opening 4 will register with the bore of the lever. The knob is now turned until the key 12 registers with the passage 14, and the knob is depressed. The enlargement 7 of the rod moves into the tapering recess 4, thus locking the transmission, and when the knob is turned the key 12 moves out of register with the passage 14 and into the groove 13. When the lock is turned in the proper direction, the tumbler 19 will be moved downwardly into the position of Fig.

4, engaging the passage 14 and preventing any rotative movement of the knob. Thus the transmission lever is not only locked in neutral position but the lock is locked against release until the proper key is made use of.

I claim:

1. The combination with the tubular gear shifting lever, of a locking rod fitted within the lever, a keeper at the lower end of the lever having an opening for receiving the rod to lock the lever in neutral position, a spring normally acting to hold the locking rod out of engagement with the keeper, means controlled by the turning of the rod in the lever for locking the lever with the rod in locking position, and a lock at the upper end of the rod having a tumbler for engaging the lever to prevent turning movement of the rod with respect to the lever, said tumbler moving longitudinally of the rod.

2. The combination with the tubular gear shifting lever, of a locking rod fitted within the lever, a keeper at the lower end of the lever having an opening for receiving the rod to lock the lever in neutral position, a spring normally acting to hold the locking rod out of engagement with the keeper, means controlled by the turning of the rod in the lever for locking the lever with the rod in locking position, said means comprising a key on the rod, and an annular keyway in the lever having a longitudinally extending portion leading to the outer end of the lever.

CHARLES SOMNER BROWN.

Witnesses:
EDNA SPENNER,
H. S. CLARK.